Dec. 2, 1924.
S. M. CRADDOCK
LINK FOR NONSKID CHAINS
Filed July 30, 1923
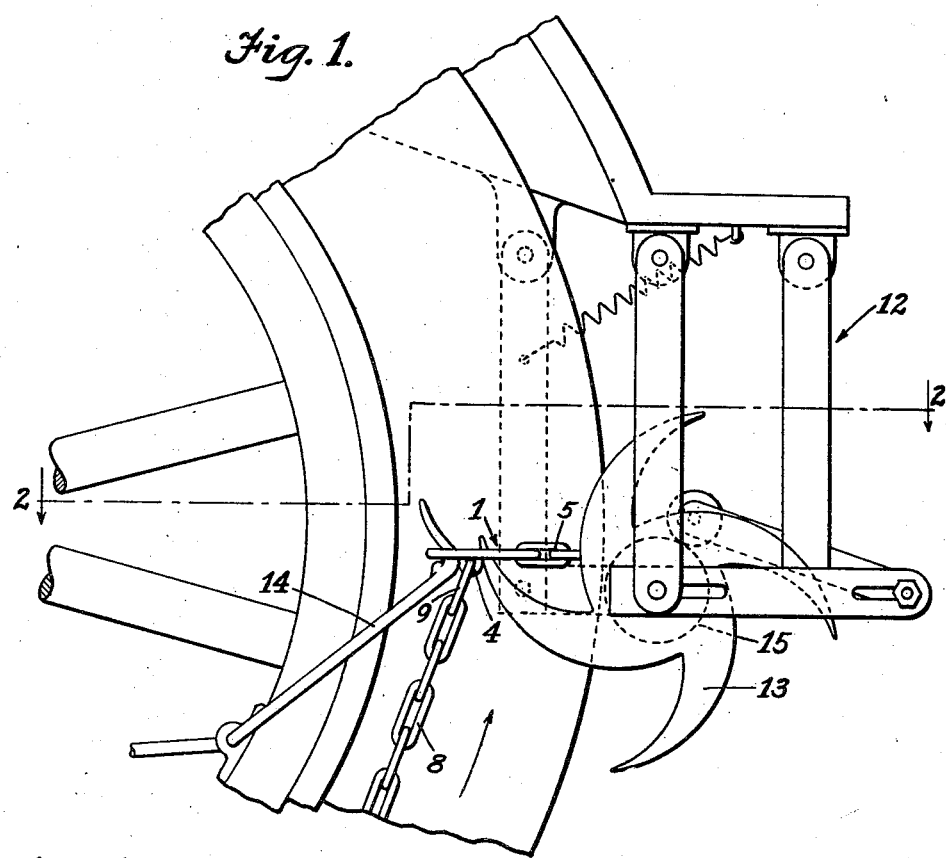
Fig. 1.
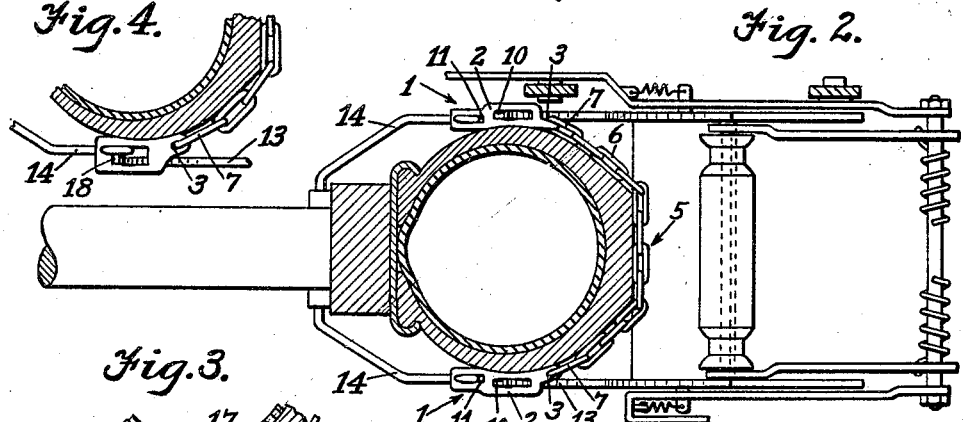
Fig. 4.   Fig. 2.
Fig. 3.
Inventor
Simon M. Craddock
By A. K. Martell
Att'y.

Patented Dec. 2, 1924.

1,517,495

UNITED STATES PATENT OFFICE.

SIMON M. CRADDOCK, OF SAN PEDRO, CALIFORNIA, ASSIGNOR TO AUTOMATIC NON-SKID CHAIN COMPANY, OF COUNTY OF LOS ANGELES, CALIFORNIA, A CORPORATION OF CALIFORNIA.

LINK FOR NONSKID CHAINS.

Application filed July 30, 1923. Serial No. 654,720.

*To all whom it may concern:*

Be it known that I, SIMON M. CRADDOCK, a citizen of the United States, residing at San Pedro, in the county of Los Angeles and State of California, have invented new and useful Improvements in Links for Nonskid Chains, of which the following is a specification.

My invention relates to links, and the general object thereof is to provide links particularly useful for connecting the end transverse connecting chain members to the ends of the circumferential chain members of non-skid chains for automobile wheels, in such manner that said links may be readily engaged by the toothed wheels and hooks of a mechanism such as disclosed in my application for means of applying non-skid chains, filed Feby. 28, 1923, Serial No. 621,825, whereby said non-skid chains may be automatically applied to the automobile wheels or removed therefrom upon rotation of said toothed wheels in one direction or the other.

Other objects and advantages will appear hereinafter and while I show herewith and will describe a preferred form of construction, I desire to be understood that I do not limit myself to such preferred form but that various changes and adaptations may be made therein without departing from the spirit of my invention as hereinafter claimed.

Referring to the drawing:

Fig. 1 is a fragmentary side elevation of a non-skid chain including my links; an automobile wheel; and a mechanism for applying said chain to the automobile wheel or removing said chain from said wheel.

Fig. 2 is a horizontal section of Fig. 1 taken on line 2—2.

Fig. 3 is a plan view of a modified form of my link showing said link connecting a non-skid chain on an automobile tire and engaged by said applying and removing mechanism.

Fig. 4 is a view similar to Fig. 3 of another modified form of my link.

Each of my links 1 comprises a metal plate 2 formed with an eye 3 at the outer end thereof and with an eye 4 on one side thereof. Non-skid chains 5 include transverse connecting chain members 6, the end links 7 of which are connected to the eyes 3 of my links 1, and circumferential chain members 8, the end links 9 of which are connected to the eyes 4 of my links. The links shown in Figs. 1 and 2 are provided each with longitudinal slots 10 and 11, the slots 10 being located intermediate the ends of the links and the slots 11 being located in the inner ends of the links.

Tread applying and removing mechanisms 12 are mounted on the automobile for applying the non-skid chains 5 to the automobile wheels or for removing said chains from the wheels, said mechanisms each including a toothed wheel 13, mounted on a fender of the automobile, and hooks 14 pivoted on the felly of a wheel. The toothed wheels 13 are adapted to engage the slots 10 in the links 1 for applying or removing the chains and the hooks 14 are adapted to engage the slots 11 in said links for holding the chains on the wheel.

The mechanisms 12 also include reels 15 for carrying the non-skid chains 5 when not applied to the wheels, the rotation of the toothed wheels 13 either unwinding said chains from said reels when applying said chains to the wheels or winding the chains upon said reels when removing said chains from the wheels.

In the form of links shown in Fig. 3 two slots 16 and 17 are provided side by side longitudinally in the link plates 2, the slots 16 being adapted to receive the teeth of toothed wheels 13 and the slots 17 being adapted to receive the hooks 14.

In the form of links shown in Fig. 4 only one wide longitudinal slot 18 is provided in the link plates 2, which slots are adapted to receive side by side both the teeth of the toothed wheels 13 and the hooks 14.

I claim as my invention:

1. A link of the character as disclosed formed with an eye for an end link of a longitudinal chain member of a non-skid chain, an eye for an end link of a transverse connecting chain member, of a non-skid chain, and means to be engaged by a tooth of a toothed wheel and a hook of a mechanism for applying a non-skid chain to a wheel or for removing said chain from said wheel.

2. A link of the character as disclosed formed with an eye for an end link of a circumferential chain member of a non-skid chain, an eye for an end link of a connecting chain member of said non-skid chain, and slots for respectively receiving a tooth of a toothed wheel and a hook of a mechanism for applying a non-skid chain to a wheel or for removing said chain from said wheel.

3. A link of the character as disclosed formed with an eye for an end link of a circumferential chain member of a non-skid chain, an eye for an end link of a connecting chain member of said non-skid chain, and slots for respectively receiving a tooth of a toothed wheel and a hook of a mechanism for applying a non-skid chain to a wheel or for removing said chain from said wheel, one of said slots being located between the ends of the link and the other slot being located at one end of said link.

4. A link of the character as disclosed formed with an eye for an end link of a circumferential chain member of a non-skid chain, an eye for an end link of a connecting chain member of said non-skid chain, and slots for respectively receiving a tooth of a toothed wheel and a hook of a mechanism for applying a non-skid chain to a wheel or for removing said chain from said wheel, the slot for receiving said toothed wheel being located between the ends of the link and the slot for receiving said hook being located at one end of said link.

SIMON M. CRADDOCK.